US007010579B1

(12) United States Patent
Batcher

(10) Patent No.: US 7,010,579 B1
(45) Date of Patent: Mar. 7, 2006

(54) DIRECT DATA ROUTING SYSTEM

(75) Inventor: Kenneth W. Batcher, Hudson, OH (US)

(73) Assignee: Cisco Technology, Inc., San Jose, CA (US)

(*) Notice: Subject to any disclaimer, the term of this patent is extended or adjusted under 35 U.S.C. 154(b) by 376 days.

(21) Appl. No.: 09/669,350

(22) Filed: Sep. 26, 2000

(51) Int. Cl.
*G06F 15/16* (2006.01)
*G06F 9/26* (2006.01)

(52) U.S. Cl. .......................... 709/217; 709/16; 709/31; 709/32; 711/161; 711/213

(58) Field of Classification Search ................ 709/213, 709/238, 216–219, 229–232; 710/52; 711/151, 711/161, 213
See application file for complete search history.

(56) References Cited

U.S. PATENT DOCUMENTS

| 4,564,900 A | * | 1/1986 | Smitt ........................ 709/212 |
| 5,101,477 A | * | 3/1992 | Casper et al. ................. 710/52 |
| 5,175,732 A | * | 12/1992 | Hendel et al. ............. 370/463 |
| 5,452,291 A | * | 9/1995 | Eisenhandler et al. ...... 370/402 |
| 5,566,349 A | * | 10/1996 | Trout .......................... 710/20 |
| 5,768,530 A | * | 6/1998 | Sandorfi ..................... 709/233 |
| 5,887,134 A | * | 3/1999 | Ebrahim ..................... 709/200 |
| 5,954,794 A | * | 9/1999 | Fishler et al. ................ 709/213 |
| 6,401,178 B1 | * | 6/2002 | Gagne et al. ................ 711/162 |
| 6,408,376 B1 | * | 6/2002 | Ganapathy et al. ........... 712/36 |
| 6,434,620 B1 | * | 8/2002 | Boucher et al. ............ 709/230 |
| 6,490,280 B1 | * | 12/2002 | Leung ........................ 370/392 |

* cited by examiner

*Primary Examiner*—Krisna Lim
*Assistant Examiner*—Yasin Barqadle
(74) *Attorney, Agent, or Firm*—Tucker Ellis & West LLP

(57) ABSTRACT

A system of data transfer between a first processing device and a second processing device which speeds data transfer by eliminating intermediate storage steps. A plurality of memory storage devices are provided between the first and second processing devices for the purpose of synchronization and alignment. One of the memory storage devices is associated with the second processing device. In accordance with a first embodiment of the present invention, a new instruction is provided to implement a data transfer function for transferring data directly between a first memory storage device and a second memory storage device, without intermediate storage in a processor register. Thereafter, the data is transferred from the second memory storage device to the memory storage device associated with the second processing device. In accordance with a second embodiment of the present invention, data is efficiently transferred directly between a first memory storage device and the memory storage device associated with the second processing device, without intermediate storage in either a processor register or a second memory storage device.

9 Claims, 2 Drawing Sheets

DIRECT DATA ROUTING SYSTEM

The present invention relates generally to a system for routing data, and more particularly to a system for accelerating data transfers by routing data in a unique and efficient manner.

BACKGROUND OF THE INVENTION

A common model for network processing consists of a multi-level approach. This is common in many Ethernet LAN protocols such as IEEE 802.3. The model typically includes 3 major levels, namely a) Top: Logical-Link control; b) Middle: Medium Access Control (MAC); and c) Bottom: Physical interface (PHY).

A wireless LAN configuration compliant to IEEE 802.11 is similar to its wired counterpart and has the same three levels. Traditionally, the top Logical-Link control tasks are handled by software running on a HOST processor. The middle level is the responsibility of a MAC processor, which handles all frame traffic between the HOST and the PHY level.

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms.

With wireless local area networks (LANs), high data rates (e.g., 56 MB/s or greater) are now attainable using new technologies such as Orthogonal Frequency Division Multiplexing (OFDM), as specified in the latest IEEE wireless standard 802.11b.

The present invention overcomes the slow data transfer rates of prior art data transfer systems to provide a data transfer system that provides the necessary throughput required by the higher data processing rates.

SUMMARY OF THE INVENTION

According to one aspect of the present invention there is provided a data transfer method for transferring data between two processing systems, wherein said two processing systems operate independently, said method comprising receiving data from a first processing system which stores the received data into a first memory device, and executing a program instruction on an associated processor to transfers at least a portion of the stored data to a second memory device.

According to another aspect of the present invention there is provided a system for transferring data between two processing systems, wherein said two processing systems operate independently, said system comprising means for receiving data from a first processing means which stores the received data into a first memory means, and executing a program instruction on an associated processing means to transfer at least a portion of the stored data to a second memory means.

According to another aspect of the present invention there is provided a system for transferring data between two processing systems, wherein said two processing systems operate independently, said system comprising means for receiving data from a first processing means which stores the received data into a first memory, means for transferring the stored data to a second memory means, and means for executing a program instruction on an associated processor means to store at least a portion of the data stored in the second memory means to a third memory means.

According to another aspect of the present invention there is provided a method for transferring data between two processing systems, wherein said two processing systems operate independently, said method comprising a first memory device for storing data received from a first processing system, and an associated processing device for executing a program instruction to transfer at least a portion of the stored data to a second memory device.

According to another aspect of the present invention there is provided a system for transferring data between two processing systems, wherein said two processing systems operate independently, said system comprising a first memory device for storing data received from a first processing system, a second memory device for receiving the data stored in the first memory device, and an associated processor for executing a memory read instruction to transfer at least a portion of the data stored in the second memory device to a third memory device.

According to another aspect of the present invention there is provided a data transfer method for transferring data between two processing systems, wherein said two processing systems operate independently, said method comprising receiving a data packet from a first processing system, wherein said data packet includes a header portion and a data portion, storing the received data packet into a first memory device, transferring the data portion of the data packet from the first memory device to a third memory device, and executing at least one program instruction on an associated processor to transfer the header portion to a second memory device.

According to another aspect of the present invention there is provided a system for transferring data between two processing systems, wherein said two processing systems operate independently, said system comprising means for receiving a data packet from a first means for processing, wherein said data packet includes a header portion and a data portion means for storing the received data packet into a first memory means, means for transferring the data portion to a third memory means, and means for executing at least one program instruction on an associated processor to transfer the header portion to a second memory means.

According to another aspect of the present invention there is provided a system for transferring data between two processing systems, wherein said two processing systems operate independently, said system comprising a first memory device for storing a data packet received from a first processing system, wherein said data packet includes a header portion and a data portion, an associated processor for executing at least one program instruction to transfer the header portion from the first memory device to a second memory device, and hardware logic enabled by the associated processor to transfer the data portion from the first memory device to a third memory device.

An advantage of the present invention is the provision of a data transfer system which provides more efficient data transfer.

Another advantage of the present invention is the provision of a data transfer system which accelerates data transfer.

Still another advantage of the present invention is the provision of a data transfer system which eliminates intermediate storage steps in a data transfer procedure. This helps to also free up register resources (e.g. general purpose registers) internal to the processor.

Still another advantage of the present invention is the provision of a data transfer system which provides the necessary throughput required by the higher data processing rates attainable using new technologies such as Orthogonal Frequency Division Multiplexing (OFDM), as specified in the latest IEEE wireless standard 802.11b.

Yet another advantage of the present invention is the provision of a data transfer system which includes a data transfer instruction which facilitates fast and efficient data transfers under the direct control of the processor software.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

While the present invention is described herein with particular reference to a "receive" operation (memory write), it should be appreciated that the present invention is also applicable to a "transmit" (memory read) operation. In such case, the data flow direction is reversed from what is illustrated for a "receive" operation.

Figure 1:
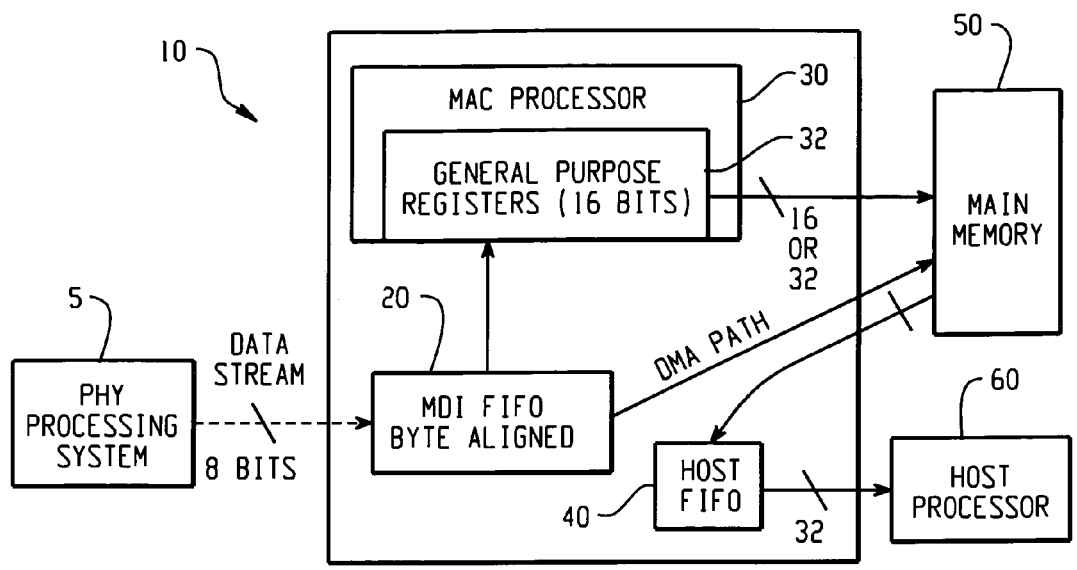
FIG. 1 is a block diagram illustrating data transfer systems according to the prior art.

Referring now to FIG. 1, a prior art data path is shown that is common in many MAC processing systems during a "receive" operation, wherein a PHY data stream is received by the MAC processing system. As noted above, the data flow is similar for a "transmit" operation, except the data direction is reversed everywhere.

MAC processing system 10 is generally comprised of an MDI (modem data interface) FIFO memory 20, a MAC processor 30, and a HOST FIFO memory 40. MAC processor 30 includes general purpose registers 32. In accordance with a typical MAC processing system, a PHY processing system 5 (e.g., an RF physical layer (PHY) processing device) transmits a PHY data stream that arrives at MAC processing system 10 as a plurality of packets (or frames) in a byte-wise fashion. It should be appreciated that FIFO memories are needed to interface with MAC processor 30 and HOST processor 60, since data rates may differ significantly between a PHY data processing system and the HOST processor. Furthermore, HOST processor 60 may be working on different packet than the packet of the PHY data stream transferring between PHY data processing system 5 and MAC processor 30. Also, the PHY data stream and the data processed by HOST processor 60 tend to be bursty in nature. Consequently, data arrives at a non-uniform data rate and thus requires a FIFO memory to synchronize the data traffic between PHY data processing system 5 and HOST processor 60. Therefore, the PHY data processing system, MAC processor 30 and HOST processor 60 operate independently of each other to form a loosely coupled system, which requires FIFOs for coordination and synchronization.

The packets comprising the PHY data stream have two main components, namely, a header portion, and a data portion. The header portion includes control information such as source, destination address; data rate, etc. It is important for MAC processor 30 to process the header information quickly so it knows how to deal with the data portion. Furthermore, some information in the header may direct MAC processor 30 to perform other actions, such as generating a response message to the sender or steering the data to another station. The data portion includes data (usually encrypted) for HOST processor 60. This data may be used by HOST processor 60 to communicate with other HOSTs across a network using some upper level protocol. Sending an FTP from one station to another station is one such example. In the case of a system complying with IEEE 802.11, HOST processor 60 does not use the 802.11 header information, as it is only used by MAC processor 30.

The PHY data is held in intermediate storage in MDI FIFO memory 20, before being transferred to MAC processor 30 for further processing. It should be understood that the PHY data may require alignment by hardware from MAC FIFO memory 20 into a data pattern compatible with MAC processor 30 (e.g., 16-bit or 32-bit words), so that MAC processor 30 can proceed with further processing of the PHY data. MAC processor 30 moves the PHY data stored in MDI FIFO memory 20 to general purpose registers 32 of MAC processor 30 for further processing. After processing by MAC processor 30, the data is typically stored as a data structure (e.g., chained buffer) residing in off-chip MAIN memory 50 as packets or frames. Later, the stored data is accessed by HOST processor 60, under the direction of MAC processor 30.

It should be appreciated that many typical MAC processing systems include a FIFO memory (e.g., MDI FIFO memory 20) so that received data can be queued up for processing by the MAC processor. This queuing process allows the received PHY data to be synchronized and properly formatted for later use when the MAC processor has time to process the data. Moreover, to transfer data one block at a time between general purpose registers 32 and main memory 50, MAC processor 30 executes a program instruction, such as "Move FIFO to Register." Therefore, the program instruction code for transferring the received data between MDI FIFO memory 20 and MAIN memory 50 may be as follows:

MOV RXHR, R1; Move contents of holding register of FIFO 20 to General Register R1 of MAC processor 30

MWR R2+, R1; Write contents of General Register R1 to MAIN Memory 50; post-increment Address Pointer R2

Accordingly, the corresponding register transfer level description is as follows:

cycle 1: R1⇐FIFO$_{holding\ register}$ move contents of Holding Register of FIFO 20 to General Register R1 of MAC processor 30 cycle 2: Mem[R2]⇐R1 Write contents of General Register R1 of MAC processor 30 to the memory address of MAIN memory 50, stored in Register R2

Likewise, on "transmit" the program instruction code for transferring data from MAIN memory 50 to the transmit MDI FIFO memory 20 is as follows:

MRD R2+,R1 Read contents of MAIN Memory 50 and store into General Register R1 of MAC processor 30; post-increment Address Pointer R2

MOV R1,TXHR Move contents of General Register R1 of MAC processor to holding register of FIFO 20

Accordingly, the corresponding register transfer level description is as follows:

cycle 1: R1⇐MEM[R2] Read contents of memory address [R2] into General Register R1 of MAC processor 30 cycle 2: $FIFO_{holding\ register}$⇐R1 Move contents of General Register R1 into FIFO holding register Thus, in accordance with the prior art, a total of two instructions are needed to transfer data to MDI FIFO memory 20 from MAIN memory 50. Thus, on "receive" it requires two instructions to perform this: (1) Fetch MOV (move) instruction, and (2) Fetch MWR (memory write) instruction. It should be appreciated that this may require 3 clock cycles on processors that have a shared data and instruction bus (vonNewman architecture), or where data dependencies in the register transfers require the processor to stall between operations.

Another prior art approach has been to use a direct memory access (DMA) function to allow hardware to move data directly from MDI FIFO memory 20 into MAIN memory 50, as also illustrated by FIG. 1. This is very efficient, since MAC processor 30 is not involved in the data transfer. However, it has a disadvantage in that MAC processor 30 loses track of the data transfer. Since the DMA activity is done by hardware, it is non-deterministic and asynchronous with respect to MAC processor 30. Therefore, MAC processor 30 is completely unaware of data movement, or even the sequence of the byte stream movement. With the protocol for wireless LANs specified by IEEE standard 802.11, it is important for MAC processor 30 to be aware of where it stands in the byte stream. This is due to the fact that IEEE 802.11 demands on the MAC processor force it to coordinate and process the data frames on a timely basis. This forces the software running on MAC processor 30 to be flexible and aware of the different types of incoming frames so it can quickly react.

DMA has other drawbacks in that typically the data is sent as a burst of consecutive bytes. This can adversely effect the MAC processor as it performs critical actions due to the additional memory traffic caused by the DMA. This may block the MAC processor from accessing the MAIN memory for other reasons while the DMA is in progress for lengthy periods of time. For example, in the case of a full duplex system (i.e., a system capable of transmitting and receiving data simultaneously), the MAC processor might be busy transmitting an important control frame to the PHY processing system. At the same time during a MAC processor receive, a MDI FIFO 20 to MAIN memory 50 DMA may cause the MAC processor to underrun on the transmit control frame. There is no way for the MAC processor to coordinate and control the DMA since it is all done by hardware. It should be understood that the present invention is applicable to a full duplex system wherein the MAC processor is capable of full duplex transfers. In full duplex, data is simultaneously transmitted and received between the MAC processor 30 and MDI FIFO 20, and between MAC processor 30 and MAIN memory 50.

Figure 2:
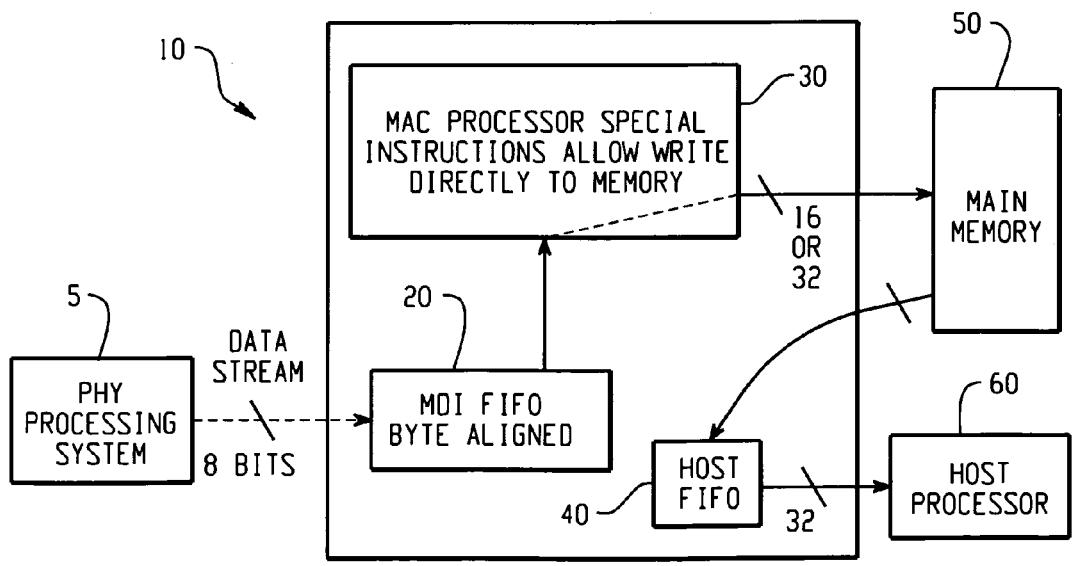
FIG. 2 is a block diagram illustrating a "receive" data transfer system according to a first embodiment of the present invention.

Referring now to FIG. 2, the present invention provides a special instruction to move data directly from MDI FIFO memory 20 to a MAIN memory 50, without the need for any transfer to an intermediate register (i.e., general purpose registers 32 of MAC processor 30). As indicated above, prior art approaches to data routing require two instructions to transfer data from MDI FIFO memory 20 to the MAIN memory 50. In accordance with a first embodiment of the present invention, there is provided an instruction function in which hardware allows a direct data transfer between MDI FIFO memory 20 and MAIN memory 50. This instruction function results in program code that is more efficient than the prior art program code described above. Exemplary program code is as follows:

Receive Operation:

MWR R2+, RXHR; Write contents of MDI FIFO memory 20 to MAIN Memory 50; Post Increment Address Pointer R2

Transmit Operation:

MRD R2+, TXHR; Read contents of MAIN Memory 50 into MDI FIFO memory 20; Post Increment Address Pointer R2

Accordingly, the corresponding register transfer level description is as follows:

Receive Operation:

cycle 1: Mem[R2]⇐$FIFO_{holding\ register}$ Write contents of Holding Register FIFO to memory address of MAIN memory 50 stored in Register R2

Transmit Operation:

cycle 1: $FIFO_{holding\ register}$⇐Mem[R2] Read contents of memory address of MAIN memory 50 stored in Register R2 into the Holding Register FIFO Therefore, a total of one instruction is needed to effect a transfer of data from MDI FIFO memory 20 to MAIN memory 50. Consequently, only one clock cycle is needed to execute the data transfer: (1) Fetch memory write instruction (MWR). It should be appreciated that this may require two clock cycles on processors that have a shared data and instruction bus (vonNewman architecture). However, there are no additional cycles (stall cycles) needed for data dependencies in the register transfers which may be required for some computer architectures using the prior art approach.

FIG. 2 illustrates the data path, wherein data merely passes through MAC processor 30 on route to MAIN memory 50, rather than being stored in an associated general purpose register. Subsequently, the data is transferred from MAIN memory 50 to HOST FIFO memory 40 via a hardware driven operation, such as a DMA function.

The new instruction function described above provides the control for directing the datapath shown in FIG. 2 to perform the direct data transfer from MDI FIFO 20 to MAIN memory 50. Since the implementation is performed using software control (i.e., the FIFO/Memory transfer instructions described above), it still provides firmware with the ability to react to the PHY data stream on a timely basis, unlike DMA.

MAC processor 30 will commonly process the entire frame (i.e., header portion and data portion) into MAIN memory 50. The data portion of this frame is formatted by MAC processor 30 to be later sent to HOST processor 60 via HOST FIFO 40 using a Host protocol (e.g., PCI bus). A DMA hardware-based engine is suitable for this action since a burst of data traffic is the preferred means of transferring data across a PCI bus. There is no need for HOST processor 60 to be aware of all data movement, an "interrupt" indicating when the block has been completely sent is one suitable solution. In this regard, HOST processor 60 does not need to react as quickly, since the timing for HOST processor 60 is much more relaxed compared to the tight timing MAC processor 30 must meet to comply with a communications protocol, such as IEEE 802.11b.

Figure 3:
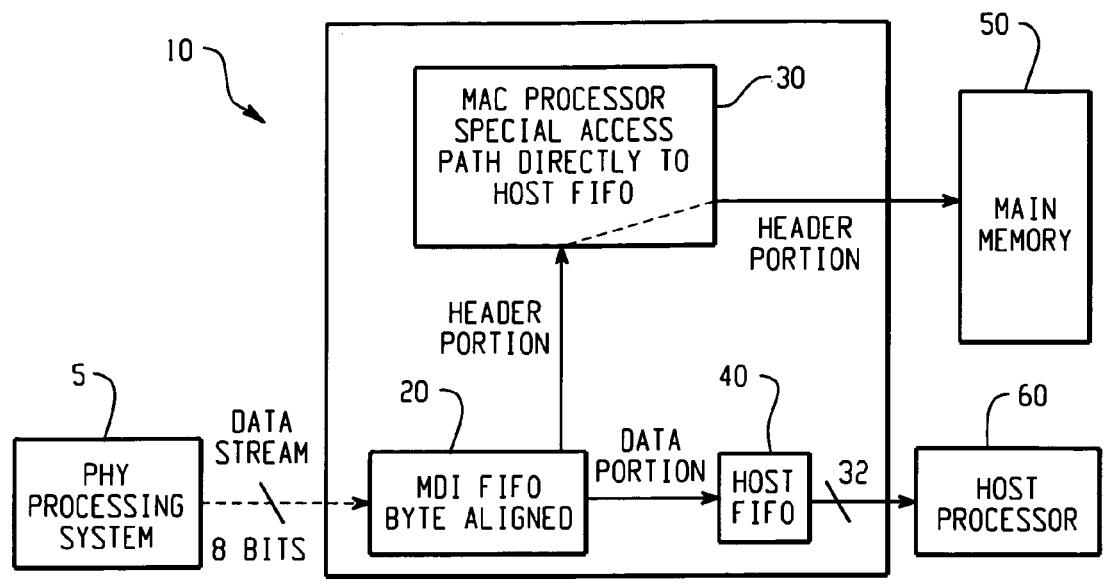
FIG. 3 is a block diagram illustrating a "receive" data transfer system according to a second embodiment of the present invention.

In accordance with a second embodiment of the present invention, data transfers (i.e., the data portion of the frame) between MDI FIFO memory 20 and MAIN memory 50 are eliminated, as will now be described with reference to FIG. 3. A direct access path from MDI FIFO memory 20 to HOST FIFO memory 40 is provided. This provides significant improvements in efficiency, i.e., even better than a DMA transfer, since intermediate storage in the MAIN memory 50 is eliminated. The improvement in throughput, power, memory space, etc. is obvious using this technique. In the second embodiment of the present invention, MAC processor 30 processes the data in two phases. First, the header portion of the frame (or packet) is processed by MAC processor 30, as described in connection with the first embodiment described above. However, after the header portion has been processed by MAC processor 30, the data portion of the frame (or packet) is transferred directly from MDI FIFO 20 to HOST FIFO 40, without any intermediate transfer to MAIN memory 50. This path is enabled under the direction of the MAC processor software using a configuration register. The header portion is subsequently transferred from MAC processor 30 to MAIN memory 50. It should be understood that a configuration bit is set by MAC processor 30 in order to enable the direct data transfer path between MDI FIFO 20 and HOST FIFO 40. No program instructions are required to enable this data transfer mode.

It should be understood that the direct data stream from MIDI FIFO 20 to HOST FIFO 40 should be carefully controlled, and may be useful only on certain frames; since MAC processor intervention is needed in many cases. On most frames it is not useful since MAC processor 30 must react and process the data on a timely basis. This is required since it is not possible to deterministically predict the contents of forthcoming frames. However, in cases where data arrives in a streaming fashion (e.g., Video or Audio data) this second embodiment can be used as an optimization. This is the case in applications such as wireless bridging devices, where a direct data transfer occurs repetitively and is more predictable. Thus, it may be preferable to utilize the second embodiment (for streaming type data frames) of the present invention in combination with the first embodiment (for other data frames and control frames) of the present invention.

One approach is to process a "lead frame" indicating to MAC processor 30 how many streamed data frames will be arriving next. At that point, MAC processor 30 knows to enable the "direct data mode" of the second embodiment, since there is a priori knowledge and predictability in the forthcoming data stream. The added advantage of this approach is not only speed and reduced memory traffic, but lower latency; since HOST processor 60 can react to the incoming data as soon as possible. This provides improved quality of service for fast PHY data to HOST data requirements found in wireless voice and video image applications where low latency is important.

Figure 4:
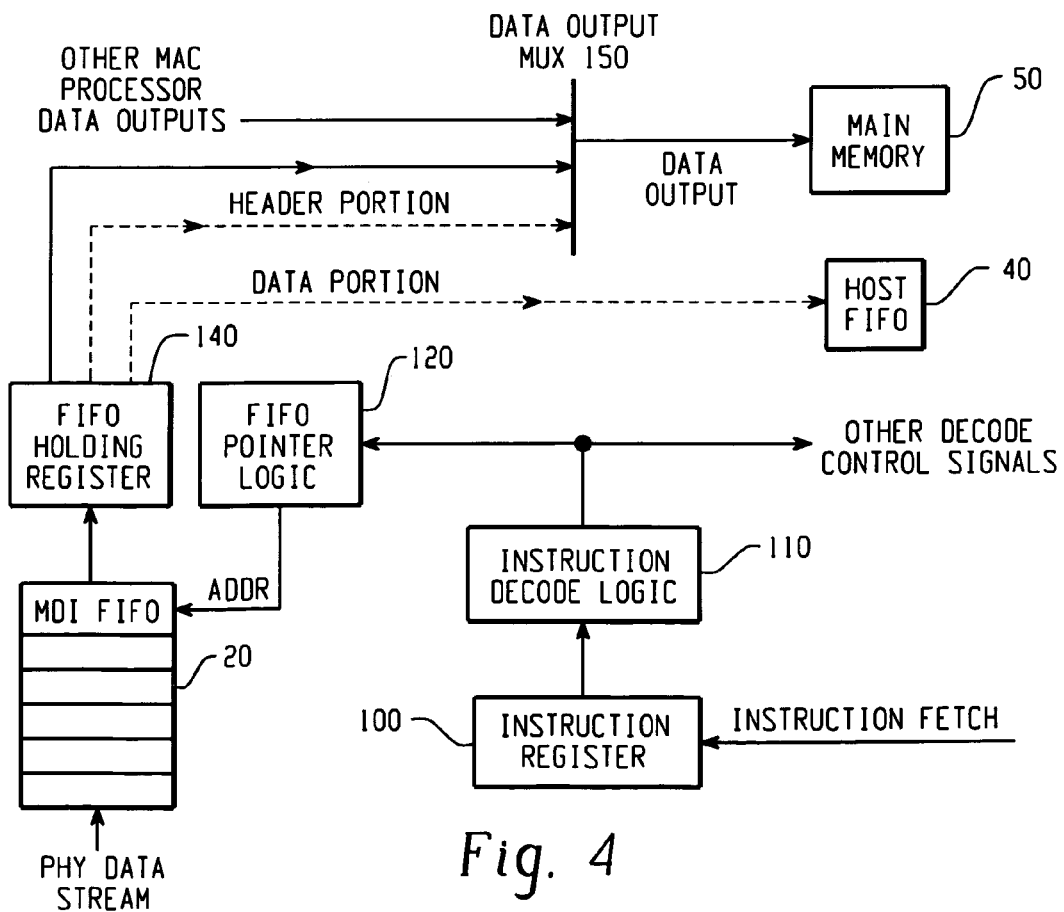
FIG. 4 is a block diagram illustrating the data path logic for a "receive" operation according to the first and second embodiments of the present invention.

Referring now to FIG. 4, there is shown the data path logic for a "receive" frame operation (FIFO to MEMORY), according to the first and second embodiments of the present invention. The dashed lines show the data path logic specific to the second embodiment. Referring to the first embodiment, the FIFO to MEMORY instruction (MRW—memory read) is fetched and decoded using instruction register 100 and instruction decode logic 110. When it executes, the data output MUX 150 is enabled to write data from the FIFO holding register 140 to off-chip MAIN memory 50. Also, the execute advances FIFO pointer logic 120 to align and load the next FIFO data location into FIFO holding register 140 for the next transfer. When the second embodiment is enabled by MAC processor 30, the data portion of the frame is sent directly from holding register 140 of MDI FIFO 20 to the HOST FIFO 40, with no further processor intervention or memory traffic. The header portion of the frame proceeds to MAIN memory 50 as in the first embodiment.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A data transfer method for transferring data between two processing systems, comprising:
    receiving a wireless signal data packet from a radio frequency physical layer processing system;
    storing the received data packet into a first memory device associated with the media access control layer, the received data packet comprising a header portion and a data portion;
    processing the header portion of the packet by a media access control layer processing system while the data packet is stored in the first Memory device;
    determining whether the data packet is one of group consisting of a video stream and an audio stream by the media access control layer processing system;
    transferring the header portion to a main memory and the data portion to a memory associated with a host processing system responsive to determining the data packet is one of the group consisting of a video stream and an audio stream; and
    executing a single processor instruction on the media access control layer to transfer the header portion and the data portion to the main memory responsive to determining the data packet is not one of group consisting of a video stream and an audio stream;
    wherein said media access control layer processing system and the host processing system operate independently.

2. A data transfer method according to claim 1, wherein said method further comprises:
    transferring the data portion of the data packet stored in said main memory to the memory associated with the host processing system, wherein the memory associated with the host processing system is upstream.

3. A data transfer method according to claim 1, wherein said first memory device is a FIFO memory device.

4. A data transfer method according to claim 1, wherein said memory associated with the host processing system is a FIFO memory device.

5. A data transfer method according to claim 1, wherein method further comprises byte-aligning the data stored in said first memory device.

6. A system for transferring data between two processing systems, comprising:
    means for receiving a wireless signal data packet from a radio frequency physical layer processing means;
    means for storing the received data packet into a first memory means, the received data packet comprising a header portion and a data portion;

means for processing the header portion of the packet by a media access control layer processor means while the packet is stored in the first memory means;

means for executing a single processor instruction on the media access control layer processor means to directly store the header portion and the data portion of the data packet into a main memory means for processing determining the data packet is not one of the group consisting of a video stream and an audio stream; and means for directly storing the header portion into a Main memory means and for directly storing the data portion of the data packet into a memory means associated with a host processing means responsive to the means for processing determining the data packet is one of wherein the media access control layer processor means and host processing means operate independently.

7. A system according to claim 6, wherein said media access control layer processing means formats the data portion stored in said main memory means using a host protocol so as to enable communication of the data portion to a remote host across a wired network.

8. A system according to claim 6, wherein said first memory means is a FIFO memory device.

9. A system according to claim 7, wherein said memory means associated with the host processing means is a FIFO memory device.

\* \* \* \* \*